United States Patent [19]

Kulkarni et al.

[11] Patent Number: 4,750,990
[45] Date of Patent: Jun. 14, 1988

[54] MEMBRANE SEPARATION OF HYDROCARBONS USING CYCLOPARAFFINIC SOLVENTS

[75] Inventors: Sudhir S. Kulkarni, Hoffman Estates; Y. Alice Chang, Westmont; John G. Gatsis, Des Plaines; Edward W. Funk, Highland Park, all of Ill.

[73] Assignee: UOP Inc., Des Plaines, Ill.

[21] Appl. No.: 932,052

[22] Filed: Nov. 18, 1986

Related U.S. Application Data

[63] Continuation-in-part of Ser. No. 660,776, Oct. 15, 1984, abandoned.

[51] Int. Cl.⁴ ............................................. C10M 11/00
[52] U.S. Cl. ................................. 208/251 R; 208/177; 208/308; 208/180; 585/818
[58] Field of Search ................... 208/177, 251 R, 290, 208/308, 179, 180; 585/818; 210/23

[56]  References Cited
U.S. PATENT DOCUMENTS 2,913,507  11/1959  Binning et al. ............... 208/177 X
2,923,749   2/1960  Lee et al. ...................... 585/819
2,960,462  11/1960  Lee et al. ...................... 208/308
2,984,623   5/1961  Lee ............................... 585/818 X
3,043,891   7/1962  Stuckey ......................... 585/818
3,305,595   2/1967  Paulson ......................... 260/674
3,919,075  11/1975  Parc et al. ..................... 208/180
3,990,963  11/1978  Audibert et al. ............... 208/179

Primary Examiner—Helen M. S. Sneed
Assistant Examiner—Glenn Caldarola
Attorney, Agent, or Firm—Thomas K. McBride; John F. Spears, Jr.; Raymond H. Nelson

[57]  ABSTRACT

Heavy crude oils which contain metal contaminants such as nickel, vanadium and iron may be separated from light hydrocarbon oils by passing a solution of the crude oil dissolved in a cycloparaffinic hydrocarbon solvent containing from about 5 to about 8 carbon atoms by passing through a polymeric membrane which is capable of maintaining its integrity in the presence of hydrocarbon compounds. The light hydrocarbon oils which possess relatively low molecular weights will be recovered as the permeate while the heavy oils which possess relatively high molecular weights as well as the metal contaminants will be recovered as the retentate.

17 Claims, No Drawings

MEMBRANE SEPARATION OF HYDROCARBONS USING CYCLOPARAFFINIC SOLVENTS

The Government of the United States of America has rights in this invention pursuant to Contract No. DE-AC07-821D12422 awarded by the U.S. Department of Energy.

CROSS REFERENCE TO RELATED APPLICATION

This application is a Continuation-in-Part of our copending application Ser. No. 660,776 filed Oct. 15, 1984, now abandoned, all teachings of which are incorporated herein by reference thereto.

BACKGROUND OF THE INVENTION

The conventional methods of separating various hydrocarbons involves technology which includes extraction, absorption, distillation, etc. techniques. However, a disadvantage of utilizing these techniques involves the use of energy which, in the present time, is relatively expensive. For example, in one aspect of petroleum refining a particular application step involves the deasphalting of a heavy crude oil which is recovered from a petroleum source such as a well. The crude oil is generally first passed to an atmospheric pipe still to produce light gases as well as a variety of distillation cuts suitable for use in the synthesis of fuels such as gasoline, etc. as well as cuts which may be useful in the petrochemical industry. The bottoms or bottom fraction from this atmospheric distillation still may then be passed to a vacuum distillation still which will recover lighter products as volatile material which can then be utilized to prepare other fuels such as diesel oil. However, as the feedstocks become heavier in nature, a significant amount of the fuel oil is not volatilized in either the atmospheric or vacuum stills.

In order to recover still useable oil fractions, the heavy bottoms from the vacuum distillation still is then subjected to the action of a solvent which comprises a relatively light hydrocarbon such as a paraffinic hydrocarbon containing from 3 to 7 carbon atoms. In order to obtain the desired fractionation of useable products, a high ratio of solvent to oil is required. For example, in the case of asphaltenes which are precipitated out of the heavy fraction, a typical process will operate with a solvent to oil weight ratio of 4:1 to 10:1 depending upon the degree of oil-asphaltene separation desired. The desired oil fraction, after separation from the precipitated asphaltenes will be recovered while, due to the expense of the solvent required for the separation, it is necessary to recover the solvent for further use. The high ratio of solvent to oil usually requires energy intensive processes due to the need for recovering the solvent by volatilization.

In view of the expense associated with the volatilization process, it is deemed necessary to provide a low-cost method of separating preferred light oils from heavy oils which contain a high asphaltene content. In addition, many crude oils also contain metal impurities which have a deleterious effect on the use of light oils for various purposes such as, for example, fuel for internal combustion engines, etc. Therefore, these metals must also be removed from the oils prior to their use thereof. It has now been discovered that a method for separating relatively light hydrocarbons or oils from relatively heavy oils and metals may be accomplished by passing a solution of heavy oils and a hydrocarbon solvent through a membrane of the type hereinafter set forth in greater detail whereby an effective separation of light oils from heavy oils and unwanted metals may be effected.

U.S. Pat. No. 3,305,595 is drawn to a process for the dialysis of heavy aromatic oils. However, the process described in this patent differs from the process of the present invention. Dialysis is the separation of solutes by means of the unequal diffusion of these solutes through membranes or diaphragms. The membrane is a continuous phase and the separation occurs by the components dissolving in the membrane phase and diffusing to the other side. In dialysis, the object is to remove solutes of certain molecular weights by taking advantage of the fact that these solutes possess a higher permeation coefficient in the membrane material than do solutes which possess other molecular weights. The bulk flow of the solvent through the membrane is prevented by balancing the osmotic pressure of the feed solution by using a flowing isotonic, that is, the same osmotic pressure solution on the other side of the membrane to take up the solutes passing through the membrane.

In contradistinction to the dialysis process, the process of the present invention utilizes a separation process which operates by ultrafiltration. In ultrafiltration, relatively large molecules are concentrated in solution by removing a portion of the solvent. Pressure is used to drive the solvent through membranes, the pressure difference typically being from about 10 to about 100 pounds per square inch gauge, in contrast to the dialysis process which, as hereinbefore set forth, is based on a diffusion-controlled rate.

U.S. Pat. No. 3,919,075 discloses a process for regenerating used lubricating oils by means of an ultrafiltration membrane. The patent teaches that a solution may be combined with the used lubricating oil to assist in the regeneration of the oil. However, both paraffinic solvents and aromatic hydrocarbons are disclosed as being suitable for use in the regeneration process. As will hereinafter be shown in greater detail, it is impossible to utilize the process of the present invention utilizing aromatic hydrocarbons as solvents for the process. The patent to Parc et al. does not recognize that the treatment of a multicomponent feedstock such as a heavy hydrocarbon crude oil necessitates the use of a specific class of solvents which have been found to be particularly efficient in serving both as a solvent for the crude oil as well as avoiding any deleterious affect upon the membrane which is employed to effect the separation process.

As will hereinafter be shown in greater detail it has now been discovered that by utilizing a particular type of solvent it is possible to combine the two advantages of solubilizing the heavy crude oil without damaging the membrane and thus permitting the membrane to maintain its integrity in the presence of the solution of oil dissolved in a solvent.

BRIEF SUMMARY OF THE INVENTION

This invention relates to a process for the separation of light oils from heavy oils. More specifically, the invention is concerned with a process for separating light oils from heavy oils or unwanted metals in a process which utilizes, as a means of separation thereof, a membrane.

As was hereinbefore set forth, it has now been discovered that a separation process may be effected utilizing, as a means of separation, certain types of membranes. The separation involves the treatment of a heavy crude oil with a certain type of hydrocarbon solvent to form a solution in which the heavy crude is dissolved in the solvent. Thereafter, the solution is passed through a membrane which will maintain its integrity in the presence of the hydrocarbon solvent, thereby separating desirable light hydrocarbons in the form of oils from heavy oils which possess a high asphaltene content as well as undesirable contaminants in the form of metals.

The separation process of the present invention may be applied in a wide variety of areas which will include the processing of the heavy oil to effect a deasphalting thereof, solvent extraction of lube oils, demetallizing of heavy oils, treatment of solvent/oil mixtures from emulsification processing as well as processes involving the extraction of edible oils, that is, vegetable or animal oils which do not contain more than about 0.1% of free fatty acid and which are used for food purposes such as cooking, salad dressing, in the manufacture of oleomargarine or other butter substitutes, etc. Such oils include, for example, soybean oil, corn oil, etc.

It is therefore an object of this invention to provide a process for separating heavy oil and contaminants contained therein from light oils.

A further object of this invention is to provide a process for separating desirable light hydrocarbons from undesirable heavy oils and contaminants utilizing, as a means of separation therefor, a membrane.

In one aspect an embodiment of this invention is found in a process for the separation of a metal-containing heavy hydrocarbon oil fraction from a light hydrocarbon oil fraction which comprises dissolving a heavy hydrocarbon crude oil in a cycloparaffinic hydrocarbon solvent containing from 5 to about 8 carbon atoms to provide a solution comprised of said crude oil and said solvent, passing the resultant solution across a porous membrane which possesses pore sizes in the range of from about 5 to about 500 Angstroms, said membrane possessing a solubility parameter, $\delta$, such that the absolute value $(\delta - 8.0) [cals/cm^3]^{\frac{1}{2}}$ is greater than 1 and which is different from the solubility parameter of said solvent and the light hydrocarbon oil fraction which is separated from the solution of the heavy hydrocarbon crude oil in said cycloparaffinic solvent, said membrane maintaining its integrity in the presence of said solution at separation conditions whereby said light hydrocarbon oil fraction is recovered as a permeate and said metal-containing heavy hydrocarbon oil fraction is recovered as a retentate.

A specific embodiment of this invention resides in a process for the separation of heavy oils and metals from light oils which comprises dissolving heavy crude oil in cyclohexane, passing the resultant solution through a polysulfone membrane at a temperature in the range of from about ambient to about 100° C. and a pressure in the range of from about 15 to about 1000 pounds per square inch gauge (psig) whereby said light oil is recovered as the permeate and said heavy oil and metals such as nickel, vanadium and iron are recovered as the retentate.

Other objects and embodiments will be found in the following detailed description of the invention.

DETAILED DESCRIPTION OF THE INVENTION

As was previously discussed, the present invention relates in principle to the process for the separation of liquids of disparate molecular weight utilizing, as a means for the separation of these liquids, a membrane of the type hereinafter set forth in greater detail. While the process as described in the present specification is directed primarily to the separation of light hydrocarbon oils from heavy hydrocarbon oils and metal contaminants, it is to be understood that the effective means of separation may also be utilized in other types of liquid separations such as, for example, the treating of emulsions whereby heavy emulsions are broken by means of a solvent; in food processes whereby edible oils are extracted utilizing, as the extraction agent, a solvent; in the preparation of synthetic fuels as exemplified by the dilution of shale oil with a solvent whereby insoluble particles may be recovered by filtration; in coal liquefaction in which a solvent is utilized to facilitate the filtration of insoluble particles or in the treatment of wood chips utilizing a solvent to dissolve the cellulosic material. It is to be understood that these various processes are given merely as examples of processes whereby various solutes dissolved in different solvents may be separated by employing a membrane to achieve the desired result.

The separation of heavy oils, that is, oils possessing a relatively high molecular weight from relatively light hydrocarbon oils which conversely possess relatively low molecular weights, may be effected by dissolving the feedstock comprising a heavy crude oil in a cycloparaffinic hydrocarbon solvent. As will hereinafter be shown in greater detail the choice of a solvent which is used for dissolving the feedstock is of critical importance in order to effect the desired separation in a commercially attractive manner without affecting the membrane utilized in the separation process. The separation is effected by passing the resultant solution over a membrane whereby a separation is effected and the light hydrocarbon oils are recovered as the permeate. The retentate will comprise the heavy oils and, in addition, a major portion of any metals which may be present in the crude oil feedstock as contaminants. The membrane which is employed to effect the desired separation will comprise an organic polymer which will maintain its integrity in the presence of hydrocarbon compounds at the particular separation conditions which are utilized to effect the desired separation. The particular organic polymer which is used should possess certain desirable characteristics with regard to stability under process conditions. For example, the polymeric material should undergo no volume change while being maintained at a temperature of 50° C. for an extended period of use which may range up to a time of one year or more; a chemical stability as evidenced by the polymer undergoing no dissolution, swelling or plasticizing when subjected to the action of a solvent at a temperature of about 25° C.-60° C.; a mechanical stability as evidenced by maintaining its physical integrity and not undergoing any compaction when placed under a pressure of 30–400 psig and, in addition, may also possess the ability or capability of easily changing porosity. In addition, the membranes may also possess a wide range of pore sizes, said pore sizes ranging from about 5 to about 500 Angstroms.

The membranes which are used to effect the separation should also be fabricated from polymers which possess a different solubility parameter than is possessed by the solvents and light hydrocarbons which are separated from the heavy oils. In the preferred embodiment of the invention, the polymers which are employed to form the membranes will possess solubility parameters $\delta$[cals/cm$^3$]$^{\frac{1}{2}}$ such that the absolute value $(\delta-8.0)$ should be greater than 1. Some representative examples of polymers which may be formed into the membranes which are useful as separation means for the process of the present invention will include thermoplastic polymers in which the solubility parameter is designated as $\delta$[cal/cm$^3$]$^{\frac{1}{2}}$ such as polysulfone, 10.6; polycarbonate, 9.6; cellulose acetate, 11.0; polyacrylonitrile, 12.4; polyvinyl alcohol, 12.6; Nylon 6,6, 13.6; Nylon 8, 12 to 14, cellulose, 15.6; polybenzoimidazole, about 11.3; polyamide, 8 to 10; polyimide, about 10 to 23, polytetrafluoroethylene (Teflon), 6.2; etc. It is to be understood that the aforementioned polymers are only representative of the type of compounds which may be employed to prepare a membrane suitable for use in the present process, and that the invention is not necessarily limited thereto.

The solvents which are employed in the process of this invention must possess certain characteristics in order that they may effectively function for the purpose intended. The solvent should possess a solubility parameter in the range of from about 7 to about 9 [cal/cm$^3$]$^{\frac{1}{2}}$, thus differentiating from the solubility parameter which is possessed by the polymeric membranes hereinbefore set forth. In addition, the solvent should also possess the ability to dissolve all of the heavy crude oil feedstock and, of paramount importance, must not attack or destroy the polymeric membrane. It has now been discovered that cycloparaffinic hydrocarbons which possess from about 5 to about 8 carbon atoms as exemplified by cyclopentane, methylcyclopentane, cyclohexane, cycloheptane, cyclooctane, etc. possess these desirable characteristics. These solvents are in contradistinction to other solvents which possess inherent disadvantages as, for example, aromatic solvents such as benzene, toluene, the xylenes, etc. which, while acting as good solvents for heavy crude oils, are disadvantageous to use inasmuch as they will rapidly dissolve or swell polymeric membrane such as polysulfone. As another example, aliphatic paraffinic hydrocarbons such as n-pentane, n-hexane, n-heptane, etc. will not attack the membrane; however, these solvents will not dissolve the asphaltene fraction of the heavy oil. The advantage of utilizing a specific cycloparaffinic hydrocarbon solvent in contrast to aromatic hydrocarbons or aliphatic paraffinic hydrocarbons will be graphically illustrated in the examples at the end of this specification.

The polymeric membranes which are used to effect the separation of heavy oils and undesirable metallic contaminants such as nickel, vanadium, iron, etc. from the light hydrocarbon oils, may be prepared in any suitable manner. For example, the polymer may be dissolved in a suitable casting solvent such as N-2-methylpyrollidone, 2-pyrollidone, dimethylformamide, dimethylsulfoxide, methyl cellusolve, etc. or mixtures thereof in an amount sufficient to form a polymer concentration in the range of from about 10% to about 30% by weight of the casting solution. The casting solution is then poured onto a casting surface which may comprise any suitable material possessing the necessary smooth surface to provide the desired flat sheet such as a glass plate, a metal plate, a polymeric backing, etc. The solution may be cast at a constant rate in the range of from about 1 to about 30 feet per minute and is passed underneath a casting knife which has been set at a predetermined space or interval from the casting surface in order to permit the obtention of a membrane at a predetermined thickness. For example, the thickness of the membrane which is in a relatively thin film may be within a range of from about 0.5 to about 15 mil and preferably in a range of from about 2 to about 6 mil.

If so desired, a time interval of from about one second to five minutes or more may elapse to allow for solvent extraction. However, as an alternative, the polymeric film on the casting surface may be immediately immersed in a water solution to provide for the coagulation of the polymer and formation of the membrane film. The temperature of the water bath may range from about 0° to about 50° C., the preferred temperature being in the range of from about 5° to about 25° C. in order to facilitate the coagulation of the polymer onto the membrane film. After allowing the polymer to form and set for a predetermined period of time, the coagulation time being dependent upon various factors including temperature, type of polymer, etc., the membrane is recovered for use in the separation process.

An alternative method for preparing the membranes comprises a continuous casting operation in which a backing such as a cloth of natural or synthetic origin such as cotton, Dacron, Nylon, nonwoven polyester, etc. is continuously passed under a hopper. The hopper will contain a solution of the polymer precursor dissolved in a solvent of the type hereinbefore set forth, said hopper being provided with an orifice at the bottom thereof for allowing passage of the solution therethrough. One side of the orifice will contain a casting knife which will be set at a predetermined distance within the range hereinbefore set forth from the surface of the backing. The fabric is then passed at a predetemined rate under the hopper wherein the upper surface of said backing is contacted with the polymeric solution and trimmed to the desired level. The coated backing is thereafter passed into a water bath which is maintained at a relatively low temperature whereby the polymer is coagulated and the resulting membrane comprising a thin film of the polymer on the porous backing may be recovered.

If so desired, additional processing steps for treatment of the membrane prior to its use as a separation means may be effected. However, these steps are optional in nature and are not essential to the formation of the desired membranes. For example, as an illustration of the additional steps, the membrane which is formed in the water bath and recovered therefrom may be placed in a 50% aqueous ethanol solution and thereafter annealed by being placed in a hot water bath in which the temperature is maintained in the range of from about 70° to about 100° C. After being heat-treated for a period of time which may range from about 0.5 to about 10 minutes, the treated membrane is recovered and dried at a temperature ranging from about ambient up to about 60° C.

Alternatively, the membranes which have been formed in the above manner may be treated with solvents possessing varying polarity whereby the membrane flux and selectivity can be tailored to fit a specific or desired objective. For example, the membranes may be soaked in solvents of decreasing polarity by treating said membrane with a water solution, removing the membrane from the water solution and placing it in a solution comprising an equal amount of water and isopropanol followed by treatment of the membrane with a 100% solution of isopropanol. Thereafter, the membrane may be treated in a 50/50% solution of isopropanol and n-pentane and finally, treated with a 100% solution of n-pentane.

The process of the present invention in which a light hydrocarbon oil is separated from heavy oils and metals may be effected in any suitable manner and may comprise either a batch or continuous type of operation. For example, when a batch type operation is employed to effect the separation, a solution of heavy crude dissolved in a cycloparaffinic hydrocarbon solvent may be placed in an appropriate apparatus such as, for example, a static cell. The membrane of the type hereinbefore set forth in greater detail may be positioned on a porous metal support which may constitute the bottom of the cell. The shape of the cell is immaterial for the separation operation and may be in cylindrical, rectangular or square form. The solution to be separated is then placed in the cell which is sealed and pressurized with a substantially inert gas such as nitrogen, argon, helium, etc. to the desired operating pressure. The solution is continuously stirred by mechanical means such as a spin bar in order to maintain a homogeneous mixture of the two components. The pressure which is maintained by continuous application of the gas will force the light hydrocarbons through the membrane to afford the desired separation, said light hydrocarbon oil being recovered as the permeate while the heavy oil and metals are recovered as the retentate.

It is also contemplated within the scope of this invention that the separation process may be effected in a continuous method of operation. When such a type of operation is employed, a reservoir which contains the solution to be separated will continuously feed the solution by means of necessary valves and pumps across the surface of a membrane which is positioned in a module. As in the case of the batch type operation, the membrane module is maintained at the proper operating conditions of temperature and pressure by external heating means as well as gas introduction means. In the membrane module the light hydrocarbon oils will pass through the membrane while the heavy oils and metals are retained on the upstream side of the membrane and may be recovered as retentate, while the light hydrocarbon may be recovered as the permeate.

The following examples are given for purposes of illustrating the process of this invention. However, it is to be understood that these examples are given merely for purposes of illustration and that the present invention is not necessarily limited thereto.

EXAMPLE I

A membrane for use in the separation process of the present invention was prepared by dissolving polysulfone in a solvent comprising a mixture of dimethyl formamide in an amount sufficient to impart a 15% to 20%, and 17-20% preferred, by weight of polysulfone in said solution, the dissolution being effected at ambient temperature and atmospheric pressure. Following this, the polysulfone was cast on a glass plate with a casting knife set at a thickness of 8-10 mils and 10 mil preferred. The solution was cast at a rate of about 5-10, and 10 is preferred, feet per minute and after a period of time had elapsed to allow for solvent evaporation, the glass plate containing the film was placed in a water solution which was maintained at 0°-10° C., and 4°-6° C. is preferred, by means of an ice bath. The polysulfone coagulated to form a membrane, and after allowing the coagulation to proceed for a period of about 30 minutes, the membrane was recovered.

A membrane prepared according to the above paragraph was placed in a stirred Amicon cell utilizing a porous support at the bottom of the cell. A feed comprising a solution of 28% heavy Boscan crude oil dissolved in cyclohexane was placed in the stirred cell.

The separation was effected at a temperature of 25° C. while subjecting the feed to a driving force of 30 psig across the membrane. Samples of the permeate were recovered after cooling the permeate sample with a dry ice bath. The results of this test are set forth in Table 1 below:

TABLE 1

| Run | Flux (GFD) | Permeate, Percent Oil | Retentate, Percent Oil |
|---|---|---|---|
| 1 | 3.7 | 20.5 | 29.9 |
| 2 | 3.0 | 20.8 | 33.7 |
| 3 | 1.7 | 23.0 | 31.3 |
| 4 | 2.4 | 21.0 | 31.2 |

In addition, GPC analysis showed that the average molecular weight of the permeate was 840 while the average molecular weight of the retentate was 2932, thus showing that the desirable low molecular weight oil is concentrated in the permeate phase while the undesirable high molecular weight oils were retained and did not pass through the membrane.

EXAMPLE II

In this example, a membrane which was prepared according to the method set forth in Example I above was used to treat heavy crude oil comprising Kuwait vacuum bottoms, the separation being effected under conditions similar to that set forth in Example I above. It was found through analysis that the flux rate of the membrane was found to be about 1.5 GSFD with a 21.4% oil in the permeate and a 37.7% oil in the retentate. In addition, the average molecular weight of the permeate was 949 and the average molecular weight of the retentate was 2146 thus further illustrating the separation of light hydrocarbon oil from the heavy oils.

A similar experiment was made using as the feedstock a solution of Arabian Long Residue dissolved in the cyclohexane. The average flux was 1.4 GSFD with 17.8% oil in the permeate and 31.3% oil in the retentate.

EXAMPLE III

To illustrate the ability of the membranes to remove a major portion of unwanted metal contaminants from feedstocks, a membrane was prepared according to the method set forth in Example I above and placed in a stirred Amicon cell. Two feedstocks comprising a 28% Boscan heavy crude oil dissolved in cyclohexane and a 28% Kuwait vacuum bottoms dissolved in cyclohexane were treated by contact with the membrane at a pressure of 30 psig and a temperature of 25° C. The permeate and retentate from this separation were measured with regard to metal content and the results are summarized in Table 2 below:

TABLE 2

| | Permeate | | Retentate | |
|---|---|---|---|---|
| Crude | Ni (ppm) | V (ppm) | Ni (ppm) | V (ppm) |
| Boscan | 14.0 | 115.0 | 66.0 | 733.0 |
| Kuwait | 4.8 | 17.0 | 43.0 | 144.0 |

The data set forth in Table 2 above shows that the permeate which is recovered from the separation process involving the use of membranes is relatively low in the undesirable metal-containing compounds, while the metals are concentrated in the retentate.

EXAMPLE IV

A membrane which is useful for the separation of light hydrocarbon oils from heavy oils may be prepared in a manner similar to that set forth in the above examples utilizing polyvinyl alcohol (PVA), cross-linked or noncross-linked, as the membrane material. The crude oil may be dissolved in a solvent comprising cyclopentane in an amount in the solution. This solution may then be placed in a stirred Amicon cell and subjected to a separation process which may be effected at a temperature of 50° C. and a driving force of 30 psig to obtain a permeate which may comprise oils having a relatively low molecular weight while the retentate may comprise heavy oils containing a relatively large molecular weight as well as a major portion of undesirable metal contaminants.

EXAMPLE V

In like manner, crude oils such as Kuwait vacuum bottoms or Arabian Long Residues may be dissolved in cycloparaffinic hydrocarbon solvents such as methylcyclopentane, cycloheptane, or cyclooctane and subjected to a separation process utilizing membranes such as cellulose acetate or polycarbonate either in a stirred cell or in a continuous flowthrough unit at separation conditions which may comprise a temperature of about 50° C. and a pressure of about 75 psig to effect a separation in which the permeate may contain oils having relatively low molecular weights while the retentate may comprise oils having relatively high molecular weights as well as a major portion of metal contaminants such as nickel, vanadium or iron.

EXAMPLE VI

To illustrate the necessity for utilizing a cycloparaffinic hydrocarbon which contains from 5 to about 8 carbon atoms as a solvent for the process of the present invention in which a light hydrocarbon oil is separated from a heavy hydrocarbon oil and metal contaminants without damaging the membrane, a series of comparative tests were performed.

In one test, cyclohexane was utilized as the cycloparaffinic hydrocarbon solvent; in the second test an aliphatic paraffinic compound, n-pentane, was used as the solvent; in the third test an aliphatic paraffinic compound comprising n-heptane was utilized as the solvent; while in the fourth test an aromatic compound comprising toluene was utilized as the solvent. Boscan crude oil and the respective solvents in the amounts specified below were each placed in a metal centrifuge test tube:

| Sample | A | B | C | D |
|---|---|---|---|---|
| Crude oil (g) | 3.99 | 3.96 | 4.13 | 3.29 |//

| Sample | A | B | C | D |
|---|---|---|---|---|
| Solvent | $c-C_6$ | $n-C_5$ | $n-C_7$ | Toluene |
| Solvent (g) | 16.74 | 16.07 | 15.92 | 18.13 |
| Solvent/Crude Ratio | 4.2 | 4.1 | 3.9 | 5.5 |

The test tube containing each sample was capped and shaken for 24 hours. At the end of that period of time the test tube was centrifuged for 20 minutes at 2500 rpm. The top portion was decanted, weighed, dried for 48 hours and sampled for concentration. The results of the tests are summarized below:

| Sample | A | B | C | D |
|---|---|---|---|---|
| Decantate (g) | 20.29 | 17.60 | 17.12 | 18.50 |
| Residue (g) | 0.015 | 1.040 | 1.004 | 0.010 |
| % of Starting Material | 0.37 | 26.2 | 24.3 | 0.29 |

The results which were obtained in the above comparative tests clearly illustrate that the solvating effect upon the crude oil is dependent upon the type of solvent which is employed. The results indicate that the aliphatic paraffinic solvents comprising n-pentane and n-heptane were not successful in dissolving substantially all of the crude oil, the use of said solvents resulting in the dissolution of only about 75% of the crude oil. These results clearly will distinguish and are in direct contrast when utilizing a cycloparaffinic hydrocarbon such as cyclohexane (Sample A) as the solvent, the use of said solvent resulting in the dissolution of 99.63% of the crude oil. While the use of an aromatic solvent such as toluene (Sample D) results in a corresponding degree of dissolution, that is, 99.71% of the crude oil, it will be shown that the use of the aromatic solvent will be detrimental to the membrane. The deleterious effect of the aromatic solvent on the membrane will, of course, result in the necessity of a continuous replacement of the membrane within a relatively short period of time, thus contributing to the inefficiency of the process.

The effect of the various solvents upon several types of membrane materials such as polysulfone or polycarbonate was determined in tests by contacting such membranes with either such solvents per se or in the form of a solution comprising at least a portion of the crude oil and the respective solvents.

The testing apparatus which was utilized in these comparative tests included a circular flat membrane support 5" in diameter upon which was placed a membrane comprising either polysulfone or polycarbonate which was produced according to the methods hereinbefore set forth in greater detail. The respective solvent or solution of solvent and crude oil was then placed within the apparatus and supported by the membrane. The apparatus was then pressurized with from about 30 to about 100 pounds per square inch of nitrogen to effect the passage of the permeate through the membrane.

When utilizing a cyclohexane solvent, the solvent contacted the polysulfone membrane for a period of 5 days without any noticeable affect upon the membrane being observed. Following this, the polysulfone membrane was contacted with a solution comprising the cyclohexane solvent and the crude oil for an additional period of thirteen days with again no affect upon the polysulfone membrane being observed.

In the next two comparative tests, the aliphatic paraffinic solvents comprising n-pentane and n-heptane contacted a polysulfone membrane for a period of thirty days with no affect upon the membrane being observed. Following this, the membrane was again contacted with a solution comprising the individual aliphatic paraffinic solvents and the solubilized portion of the crude oil, the undissolved portion of the crude oil (approximately 75% of the original amount) being removed prior to the contacting step. Again no ill effects upon the membrane were observed.

In contradistinction to this, when toluene per se was permitted to contact the polysulfone membrane, the membrane dissolved after a period of only about 30 minutes and thus was rendered non-functional as a membrane effective for the separation of light hydrocarbon oils from heavy hydrocarbon oils.

When polycarbonate was used as a membrane, results similar in nature to those observed by the use of a polysulfone membrane were found. Contact of the polycarbonate membrane with cyclohexane alone for one day indicated that the membrane was not affected by the solvent. In like manner, contact of the polycarbonate membrane with either n-pentane or n-heptane alone for a period of three days showed no ill effect on the membrane by the solvents. In contradistinction to this, contact of the polycarbonate membrane with toluene alone rendered the membrane gel-like in nature after a period of 1 hour, thus causing the membrane to cease functioning as an ultrafiltration membrane.

The above results clearly indicate that the use of a cycloparaffinic hydrocarbon solvent will permit the separation of a light hydrocarbon oil from a heavy hydrocarbon oil and contaminant metals in an efficient manner by (1) dissolving substantially all of the feedstock in the solvent and effecting the desired separation by passage through a membrane without (2) causing any deleterious affect upon the membrane. In contrast to this, while an aliphatic paraffinic solvent may be used without affecting the integrity of the membrane, the solvent will only dissolve a relatively small portion of the feedstock thus necessitating the use of an extraordinary amount of solvent in order to dissolve all of the crude oil, if possible, when compared to a cycloparaffinic hydrocarbon. Again in contrast, an aromatic solvent will permit the dissolution of substantially all of the feedstock to form an operable solution but will have the disadvantage in that the passage of the solution through the membrane will cause the membrane to lose its ability to act as such within a relatively short period of time.

We claim as our invention:

1. A process for the separation of a metal-containing heavy hydrocarbon oil fraction from a light hydrocarbon oil fraction which comprises dissolving a heavy hydrocarbon crude oil in a cycloparaffinic hydrocarbon solvent containing from 5 to about 8 carbon atoms to provide a solution comprised of said crude oil and said solvent, passing the resultant solution across a porous membrane which possesses pore sizes in the range of from about 5 to about 500 Angstroms, said membrane possessing a solubility parameter in which the absolute value $(\delta - 8.0)$ $[cal/cm^3]^{\frac{1}{2}}$ is greater than 1 and which is different from the solubility parameter of said solvent and the light hydrocarbon oil fraction which is separated from the solution of the heavy hydrocarbon crude oil in said cycloparaffinic solvent, said membrane maintaining its integrity in the presence of said solution at separation conditions whereby said light hydrocarbon oil fraction is recovered as a permeate and said metal-containing heavy hydrocarbon oil fraction is recovered as a retentate.

2. The process as set forth in claim 1 in which said separation conditions include a temperature in the range of from about ambient to about 100° C. and a pressure in the range of from about 15 to about 1,000 pounds per square inch gauge.

3. The process as set forth in claim 1 in which said solution contains a weight ratio of heavy hydrocarbon crude oil to cycloparaffinic hydrocarbon solvent in a range of from about 0.1:1 to about 1:1.

4. The process as set forth in claim 1 in which said porous membrane comprises a thermoplastic polymer.

5. The process as set forth in claim 4 in which said thermoplastic polymer comprises polysulfone.

6. The process as set forth in claim 4 in which said thermoplastic polymer comprises cellulose acetate.

7. The process as set forth in claim 4 in which said thermoplastic polymer comprises polyvinyl alcohol.

8. The process as set forth in claim 4 in which said thermoplastic polymer comprises polycarbonate.

9. The process as set forth in claim 4 in which said thermoplastic polymer comprises poly(tetrafluoroethylene).

10. The process as set forth in claim 1 in which said cycloparaffinic hydrocarbon solvent is cyclopentane.

11. The process as set forth in claim 1 in which said cycloparaffinic hydrocarbon solvent is cyclohexane.

12. The process as set forth in claim 1 in which said cycloparaffinic hydrocarbon solvent is methylcyclopentane.

13. The process as set forth in claim 1 in which said cycloparaffinic hydrocarbon solvent is cycloheptane.

14. The process as set forth in claim 1 in which said cycloparaffinic hydrocarbon solvent is cyclooctane.

15. The process as set forth in claim 1 in which said metal is nickel.

16. The process as set forth in claim 1 in which said metal is vanadium.

17. The process as set forth in claim 1 in which said metal is iron.

* * * * *